United States Patent [19]

Heinz et al.

[11] Patent Number: 4,867,912

[45] Date of Patent: Sep. 19, 1989

[54] HIGHLY HEAT-RESISTANT POLYARYL ETHER KETONES

[75] Inventors: Gerhard Heinz, Weisenheim; Juergen Koch, Neuhofen; Manfred Eggersdorfer, Frankenthal; Jochem Henkelmann, Mutterstadt; Helmut Muenstedt, Wachenheim; Peter Ittemann, Ludwigshafen, all of Fed. Rep. of Germany

[73] Assignee: BASF Aktiengesellschaft, Ludwigshafen, Fed. Rep. of Germany

[21] Appl. No.: 142,715

[22] Filed: Jan. 11, 1988

[30] Foreign Application Priority Data

Jan. 14, 1987 [DE] Fed. Rep. of Germany ....... 3700810

[51] Int. Cl.$^4$ .................. C08G 8/02; C08G 14/00
[52] U.S. Cl. .................. 528/125; 528/126; 528/128; 528/219
[58] Field of Search ............... 528/125, 126, 128, 219

[56] References Cited

U.S. PATENT DOCUMENTS

| 4,052,365 | 10/1977 | Jones | 528/206 |
|---|---|---|---|
| 4,320,224 | 3/1982 | Rose et al. | 528/125 |
| 4,536,544 | 8/1985 | Matzner et al. | 525/68 |

FOREIGN PATENT DOCUMENTS 0001879  3/1982  European Pat. Off. .

*Primary Examiner*—John Kight
*Assistant Examiner*—M. L. Moore
*Attorney, Agent, or Firm*—Oblon, Spivak, McClelland, Maier & Neustadt

[57] ABSTRACT

Highly heat-resistant polyaryl ether ketones are composed of
(A) from 50 to 100 mol % of repeat units of the general formula I

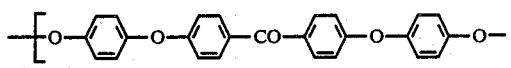

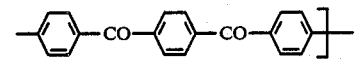

or a ring-substituted $C_1$–$C_8$-alkyl, $C_1$–$C_8$-alkoxy, aryl, chlorine or fluorine derivative thereof and
(B) from 0 to 50 mol % of repeat units, different from I, of the general formulae II and/or III

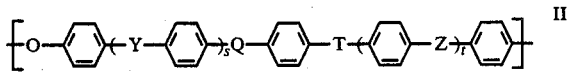

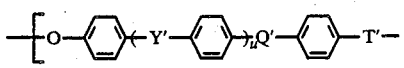

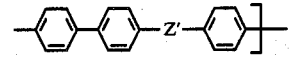

or a ring-substituted $C_1$–$C_8$-alkyl, $C_1$–$C_8$-alkoxy, aryl, chlorine or fluorine derivative thereof, where Q, Q', Y, Y', T, T', Z and Z' are each —O—, —CO— or a chemical bond, one or more of these substituents is a —CO— group, and s, t and u are each 0 or 1.

9 Claims, No Drawings

HIGHLY HEAT-RESISTANT POLYARYL ETHER KETONES

The present invention relates to a highly heat-resistant polyaryl ether ketone composed of (A) from 50 to 100 mol % of repeat units of the general formula I

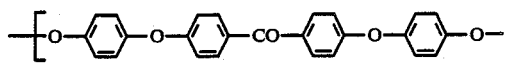

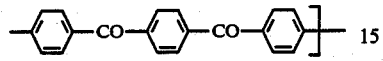

or a ring-substituted $C_1$-$C_8$-alkyl, $C_1$-$C_8$-alkoxy, aryl, chlorine or fluorine derivative thereof and (B) from 0 to 50 mol % of repeat units, different from I, of the general formulae II and/or III

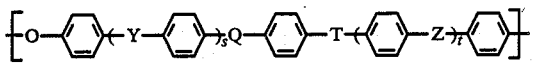

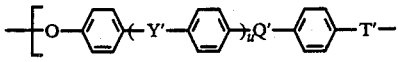

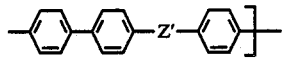

or a ring-substituted $C_1$-$C_8$-alkyl, $C_1$-$C_8$-alkoxy, aryl, chlorine or fluorine derivative thereof, where Q, Q', Y, Y', T, T', Z and Z' are each —O—, —CO— or a chemical bond, one or more of these substituents is a —CO— group, and s, t and u are each 0 or 1.

The present invention further relates to a method of using such a polyaryl ether ketone for producing a molding, and to a molding containing this polyaryl ether ketone as essential component.

The present invention further relates to a blend of such a polyaryl ether ketone with a conventional polyaryl ether sulfone.

EP-A-1,879 discloses polyaryl ether ketones having repeat units of the formula

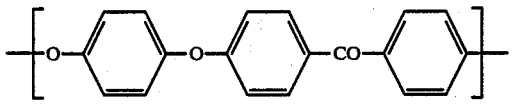

which may contain up to 50 mol % of other polyaryl ether ketone units. However, these products are not sufficiently heat-resistant for some applications. In addition, the 4,4'-difluorobenzophenone used as a monomer in said EP-A is very expensive.

It is an object of the present invention to provide a polyaryl ether ketone which has a high heat distortion resistance and which can also be prepared from inexpensive monomers.

We have found that this object is achieved with the highly heat-resistant polyaryl ether ketone defined at the beginning.

In a first preferred embodiment, the polyaryl ether ketone according to the invention is exclusively composed of repeat units of the general formula I

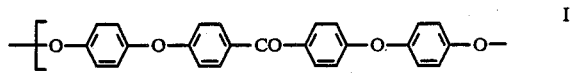

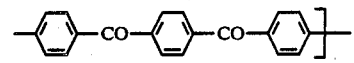

Products of this type are commonly classified as of the PEEKEEKK type, where E is an ether bridge and K a keto bridge.

In principle, the aromatic units can be substituted by $C_1$-$C_8$-alkyl, $C_1$-$C_8$-alkoxy, aryl, Cl or fluorine. Examples of substituents of this type are methyl, ethyl, i-propyl, n-, i- or t-butyl, the corresponding alkoxy groups, and also phenoxy groups. In general, however, the unsubstituted derivatives are preferred.

Polyaryl ether ketones of this type can be prepared in a conventional nucleophilic or electrophilic manner.

A first possible method of preparation comprises polycondensing dihydroxy compounds with dihalo compounds, which is common knowledge.

In the present case, for example, 4,4'-di(4-hydroxyphenoxy)benzophenone and 1,4-di(4-fluorobenzoyl)benzene or 4,4'-di[4-(4-hydroxyphenoxy)benzoyl]benzene and 4,4'-difluorobenzophenone can be used as monomers.

1,4-Di(4-fluorobenzoyl)benzene and 4,4'-difluorobenzophenone and methods for preparing same are known and described in the literature. 1,4-Di(4-fluorobenzoyl)benzene has the formula

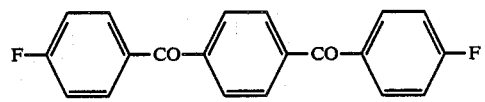

4,4'-Di(4-hydroxyphenoxy)benzophenone

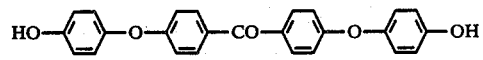

can be prepared by reacting 4,4'-dichlorobenzophenone with an alkali metal salt of hydroquinone mono-t-butyl ether to give 4,4'-di(4-t-butoxyphenoxy)benzophenone and then cleaving the t-butyl ether.

In basically the same way it is possible to prepare 4,4'-di[4-(4-hydroxyphenoxy)benzoyl]benzene

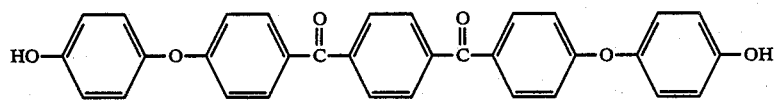

can be prepared by using 1,4-di(4-chlorobenzoyl)benzene in place of 4,4'-dichlorobenzophenone.

The reaction conditions for the individual stages in the preparation of the above monomers correspond to those generally employed for such reactions, so that no details are required here.

The process conditions for preparing the polyaryl ether ketone according to the invention, such as temperature, pressure, type of solvent and type of additives (catalysts) if any, are the same as described in EP-A-1,879, so that no details are required here.

It is particularly convenient to carry out the reaction in an aprotic polar solvent in the presence of an anhydrous alkali metal carbonate as base. A particularly preferred combination consists of diphenyl sulfone as solvent and $K_2CO_3$ as base.

The amount of diphenyl sulfone ranges in general from 5 to 100 moles, preferably from 5 to 20 moles, per mole of monomer. This produces a preferred solids content of the reaction solution within the range from 5 to 50% by weight, particularly preferably from 10 to 40% by weight.

The water formed in the course of the polycondensation can be removed by means of an azeotrope agent, by employing reduced pressure or preferably introducing a nitrogen stream and distilling off.

Suitable azeotropic agents are all those compounds which, under atmospheric pressure, boil within the range of the reaction temperature and are homogeneously miscible with the reaction mixture without entering chemical reactions.

The reaction temperature is generally within the range from 150° to 400° C., preferably 250° to 400° C., and in particular 250° to 350° C.; the total reaction time depends on the desired degree of condensation, but in general is within the range from 0.1 to 15 hours.

After the polycondensation, the product can be stabilized by reacting free phenolate end groups with an arylating or alkylating agent, eg. methyl chloride. This is preferably done at up to 350° C., the lower temperature limit being determined by the solubility of the polymer in the solvent used.

The reaction product can be worked up in a conventional manner. Advantageously, the melt is turned into a finely divided material which is freed from solvent (eg. diphenyl sulfone) by extraction with a suitable solvent, eg. acetone. Thereafter, residues of alkali metal carbonate and alkali metal fluoride can be removed by extraction with water.

The conditions for a preparation in an electrophilic manner, viz. a method of preparation by Friedel-Crafts acylation, are described for example in EP-A-124,276 or EP-A-138,990 and US-A-3,956,240.

The electrophilic polymerization generally comprises reacting monomers having carboxyl or carboxyl derivative groups with monomers containing activated hydrogen atoms in solvents in the presence of catalysts. The type and quantity of solvents and catalysts are described in previously mentioned EP-A-124,276, EP-A-138,990 and US-A-3,956,240, so that no details are required here. To construct repeat units of the general formula I it is possible to use in the electrophilic synthesis terephthaloyl chloride and 4,4'-di[(4-phenoxy)phenoxy]benzophenone, the latter monomer being in turn obtainable by reacting 2 moles of p-hydroxydiphenyl ether with 1 mole of 4,4'-dichlorobenzophenone.

This reaction conforms to the empirical equation

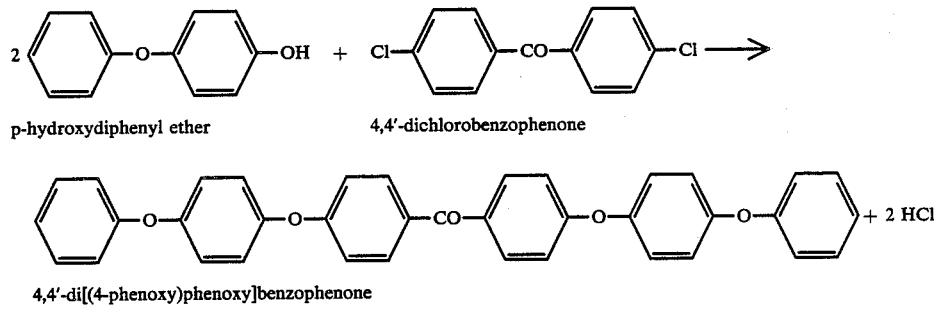

p-hydroxydiphenyl ether      4,4'-dichlorobenzophenone 4,4'-di[(4-phenoxy)phenoxy]benzophenone The molecular weight (weight average) of the polyaryl ether ketones according to the invention composed exclusively of units of the formula I ranges in general from 10,000 to 150,000, preferably from 15,000 to 100,000.

In a further embodiment, the polyaryl ether ketone according to the invention additionally contains up to 50, in particular from 5 to 45, particularly preferably from 10 to 40, mol % of repeat units of the general formulae II and/or III

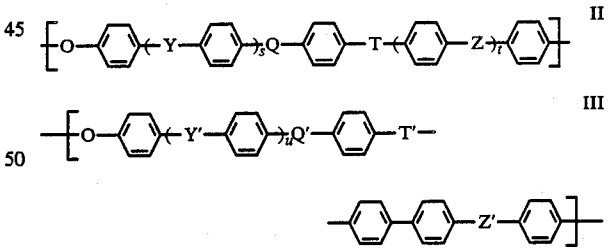

or their ring-substituted $C_1$–$C_8$-alkyl, $C_1$–$C_8$-alkoxy, aryl, chlorine or fluorine derivatives, where Q, Q', Y, Y', T, T', Z and Z' can each be —O—, —CO— or a chemical bond, one or more of these substituents is —CO—, and s, t and u are each 0 or 1.

Examples of units of the general formulae II and III are:

(III)

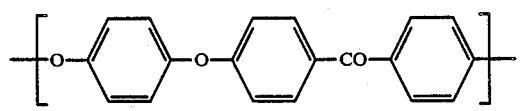

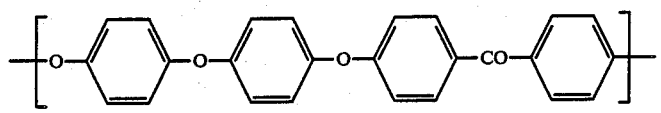
(II2)
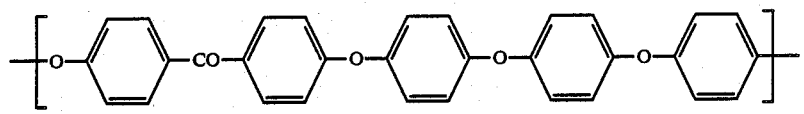
(II3)
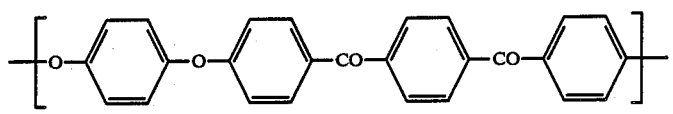
(II4)
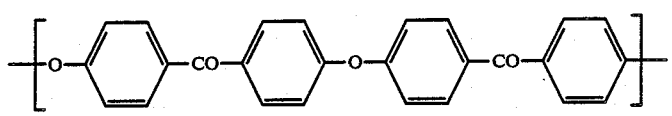
(II5)
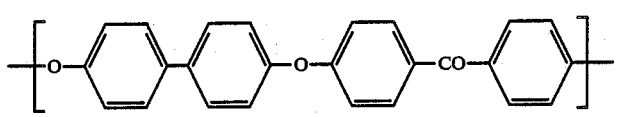
(II6)
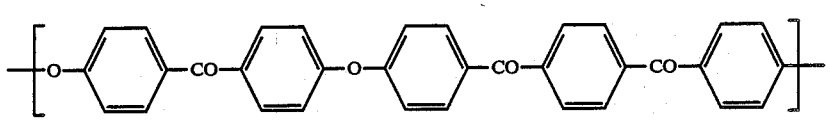
(II7)
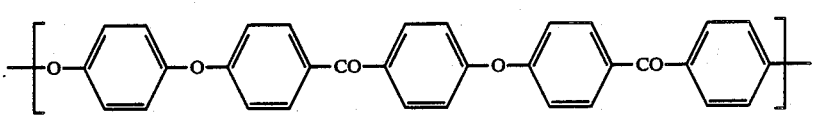
(II8)
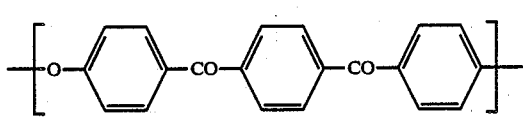
(II9)
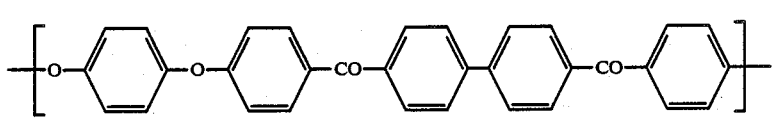
(III1)
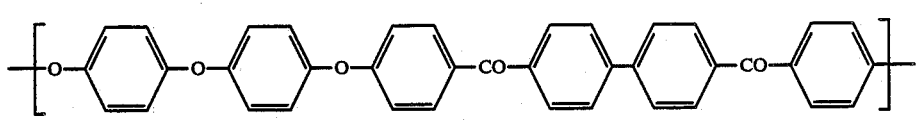
(III2)
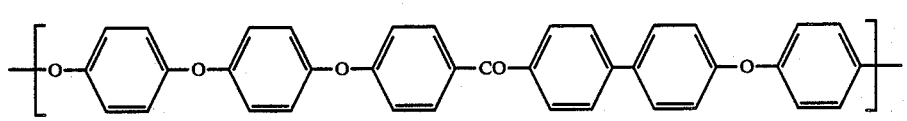
(III3)
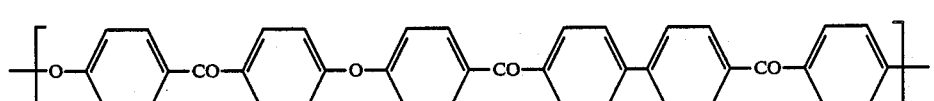
(III4)
although this selection is only a sample of the units falling within the general formulae II and III. In terms of the substituents Y, T and Z or Y', T' and Z' and the parameters s, t and u, the foregoing examples can be described as follows:
| | s | t | Y | T | Z | Q |
|---|---|---|---|---|---|---|
| II1 | 0 | 0 | — | —CO— | — | —O— |
| II2 | 1 | 0 | —O— | —CO— | — | —O— |
| II3 | 1 | 1 | —CO— | —O— | —O— | —O— |

-continued

|     |   |   |           |      |      |      |
| --- | - | - | --------- | ---- | ---- | ---- |
| II4 | 0 | 1 | —         | —CO— | —CO— | —O—  |
| II5 | 1 | 0 | —CO—      | —CO— | —    | —O—  |
| II6 | 1 | 0 | chem. bond| —CO— | —    | —O—  |
| II7 | 1 | 1 | —CO—      | —CO— | —CO— | —O—  |
| II8 | 1 | 1 | —O—       | —O—  | —CO— | —CO— |
| II9 | 0 | 0 | —         | —CO— | —    | —CO— |

|      | y | Y′   | T′   | Z′   | Q′  |
| ---- | - | ---- | ---- | ---- | --- |
| III1 | 0 | —    | —CO— | —CO— | —O— |
| III2 | 1 | —O—  | —CO— | —CO— | —O— |
| III3 | 1 | —O—  | —CO— | —O—  | —O— |
| III4 | 1 | —CO— | —CO— | —CO— | —O— |

Although, in principle, any desired combination of the substituents Y, T and Z or Y′, T′ and Z′ is possible, in general preference is given to those units where T and Z on the one hand and T′ and Z′ on the other are identical since the corresponding monomers are generally more easily accessible.

The units of the formula II and/or III can be incorporated in the polyaryl ether ketone according to the invention either randomly or in the form of blocks.

Random incorporation is obtained simply by adding the monomers which produce units II and/or III to a mixture of those monomers which produce the units of the general formula I. A blockwise structure is obtained by either joining together ready-prepared blocks of the units I, II and III or, in the polymerization, adding the monomers which produce the various repeat units different points in time.

The process conditions are basically the same as described above for the preparation of the polyaryl ether ketone which contains only repeat units of the general formula I.

The molecular weight (weight average) of the polyaryl ether ketone which is composed of repeat units of the general formulae I and II and/or III ranges in general from 10,000 to 150,000, preferably from 15,000 to 100,000, in particular from 18,000 to 80,000.

If the repeat units are arranged in blocks, the molecular weight of the individual blocks ranges in general from 500 to 15,000, in particular from 1500 to 10,000.

In addition, a further embodiment of the invention provides a blend of various polyaryl ether ketones which can differ in their composition or, if they are of the same composition, in their molecular weight.

The polyaryl ether ketones according to the invention can be blended with fillers, pigments, and other processing aids.

Examples of reinforcing fillers are asbestos, carbon fibers and preferably glass fibers, the latter having, after incorporation, an average length from 0.05 to 1 mm, preferably from 0.1 to 0.5 mm, and being employed for example in the form of glass fabrics or (surfacing) mats and/or preferably glass filament rovings or cut glass filament made from low-alkali E glasses and ranging from 5 to 20 $\mu$m, preferably from 8 to 15 $\mu$m, in diameter. The molding compositions reinforced with glass filament rovings or cut glass filament contain from 10 to 60% by weight, preferably from 20 to 50% by weight, of the reinforcing agent, based on the total weight, while the impregnated glass fabric and/or (surfacing) mats contain from 10 to 80% by weight, preferably from 30 to 60% by weight, of polyaryl ether ketone, based on the total weight. Suitable pigments are for example titanium dioxide, cadmium sulfide, zinc sulfide, barium sulfate and carbon black. Examples of other additives and auxiliary substances are dyes, lubricants, eg. polytetrafluoroethylene, graphite or molybdenum disulfide, abrasives, for example carborundum, light stabilizers and hydrolysis inhibitors. Even wollastonite, calcium carbonate, glass balls, quartz powder and boron nitride or mixtures thereof are usable. Pigments, additives and auxiliary substances are customarily used in amounts of from 0.01 to 10% by weight, based on the weight of the polyaryl ether ketone.

A further embodiment of the present invention relates to blends of polyaryl ether ketones as described herein with conventional polyaryl ether sulfones. Suitable polyaryl ether sulfones are for example those composed of repeat units in line with the general formulae II and III, with the proviso that one or more of the parameters Y, T and Z or Y′, T′ and Z′ has to be $SO_2$.

Examples of polyaryl ether sulfones are obtained by replacing the CO groups in the formulae II1 to II9 and III1 to III4 by $SO_2$ groups.

Polyaryl ether sulfones of this type as well as processes for preparing the same are known and described in the literature, so that no details are required here.

The polyaryl ether sulfone content in these blends ranges in general from 10 to 90, in particular from 20 to 80, % by weight.

The polyaryl ether ketones according to the invention are distinguished by balanced mechanical properties, in particular by good heat distortion resistance. They can be used for producing fibers, films and moldings.

EXAMPLE 1

In a four-necked glass flask equipped with a stirrer, a nitrogen inlet, an internal thermometer and an air cooler, 79.68 g (0.2 mol) of 4,4′-di(4-hydroxyphenoxy)-benzophenone, 64.46 g (0.2 mol) of 4,4′-di(4-fluorobenzoyl)benzene, 30.41 g (0.22 mol) of potassium carbonate and 800 g of diphenyl sulfone were heated to 200° C. and maintained at that temperature for 2 hours. The temperature was then raised to 240° C., maintained for 1 hour, then to 280° C., maintained for 1 hour, then to 320° C. and again maintained for 1 hour. After cooling down, the reaction mass was ground. The resulting fine powder was washed four times for 10 minutes with hot acetone, three times for 10 minutes with boiling water and for a further 5 minutes with acetone to remove diphenyl sulfone and inorganic matter. The polymer powder thus obtained was dried at 150° C. under reduced pressure for 10 hours. According to DSC, the polymer had a glass transition point of 151° C. and a melting point of 352° C. The reduced viscosity was 1.41 (measured in concentrated sulfuric acid at 23° C., 1 g/100 ml).

A larger amount of polymer prepared in the same way was satisfactorily extrudable at 400° C. without change in the molecular weight.

EXAMPLE 2

100.50 g (0.2 mol) of 1,4-di[4-(4-hydroxyphenoxy)-benzoyl]benzene, 43.64 g (0.2 mol) of 4,4′-difluorobenzophenone and 30.41 g (0.22 mol) of potassium carbonate were reacted in 800 g of diphenyl sulfone under the same conditions as in Example 1.

The polymer thus obtained has a reduced viscosity of 1.38 (measured in concentrated sulfuric acid). The physical properties are identical to those of the product of Example 1.

We claim:

1. A highly heat-resistant polyaryl ether ketone composed of
   (A) from 50 to 100 mol % of repeat units of the general formula I

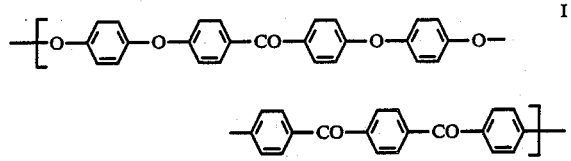

or a ring-substituted $C_1$-$C_8$-alkyl, $C_1$-$C_8$-alkoxy, aryl, chlorine or fluorine derivative thereof and
   (B) from 0 to 50 mol % of repeat units, different from I, of the general formulae II and/or III

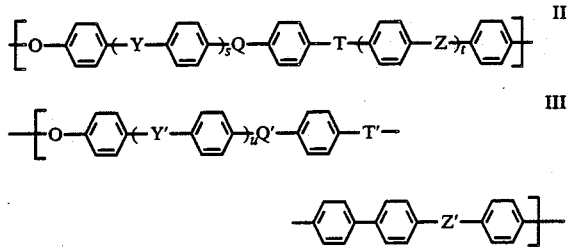

or a ring-substituted $C_1$-$C_8$-alkyl, $C_1$-$C_8$-alkoxy, aryl, chlorine or fluorine derivative thereof, where Q, Q', Y, Y', T, T', Z and Z' are each —O—, —CO— or a chemical bond, one or more of these substituents is a —CO— group, and s, t and u are each 0 or 1.

2. A highly heat-resistant polyaryl ether ketone as claimed in claim 1, which contains only units of the formula I.

3. A highly heat-resistant polyaryl ether ketone as claimed in claim 1, which contains from 5 to 45 mol % of units of the formula II.

4. A highly heat-resistant polyaryl ether ketone as claimed in claim 1, containing from 2 to 70% by weight of reinforcing fillers.

5. A highly heat-resistant polyaryl ether ketone as claimed in claim 1, containing from 0.1 to 10% by weight of polytetrafluoroethylene, graphite and/or molybdenum sulfide.

6. A blend of highly heat-resistant polyaryl ether ketones as claimed in claim 1.

7. A blend of from 10 to 90% by weight of polyaryl ether ketone as claimed in claim 1 and from 10 to 90% by weight of a polyaryl ether sulfone.

8. A molding containing as an essential component a highly heat-resistant polyaryl ether ketone as claimed in claim 1.

9. A method for producing a molding which comprises extruding the highly heat-resistant polyaryl ether ketone of claim 1.

* * * * *